(12) United States Patent
Hellerstein et al.

(10) Patent No.: US 6,925,452 B1
(45) Date of Patent: Aug. 2, 2005

(54) METHOD AND SYSTEM FOR RECOGNIZING END-USER TRANSACTIONS

(75) Inventors: Joseph L. Hellerstein, Ossining, NY (US); Irina Rish, White Plains, NY (US); Jayram S. Thathachar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/575,553

(22) Filed: May 22, 2000

(51) Int. Cl.⁷ .......................... G06F 15/18; G05B 13/00
(52) U.S. Cl. ........................................... 706/16; 706/12
(58) Field of Search ................................... 700/15–44

(56) References Cited

U.S. PATENT DOCUMENTS 5,727,950 A   3/1998  Cook et al.
5,867,799 A * 2/1999  Lang et al. ..................... 707/1

FOREIGN PATENT DOCUMENTS

WO   WO 93/20508     10/1993
WO   WO 01/09792 A2   2/2001

OTHER PUBLICATIONS

"Implementing Remote Procedure Calls" Andrew D. Birrell and Bruce Jay Nelson, (Xerox Palo Alto Research Center); ACM Transaction s on Computing Systems, vol. 2, No. 1, Feb. 1984, pps. 39–59.*

J. Pearl, "Probabilistic Reasoning In Intelligent Systems: Networks of Plausible Inference," Markov and Bayesian Networks, 3.3 Bayesian Networks, pp. 116–121.

"Statistical Methods for Speech Recognition," Chapter 5, The Viterbi Search, pp. 79–85.

T.M. Mitchell, "Machine Learning," Chapter 6, Bayesian Learning, pp. 176–185.

D. Beeferman et al., "Statistical Models for Text Segmentation," School of Computer Science, Carnegie Mellon University, Pittsburgh, PA 15213, USA, pp. 1–37.

* cited by examiner

*Primary Examiner*—Anthony Knight
*Assistant Examiner*—Michael B. Holmes
(74) *Attorney, Agent, or Firm*—Rafael Perez-Pineiro; Ryan, Mason & Lewis, LLP (57) ABSTRACT

A method and system are described for end-user transaction recognition based on server data such as sequences of remote procedure calls (RPCs). The method may comprise machine-learning techniques for pattern recognition such as Bayesian classification, feature extraction mechanisms, and a dynamic-programming approach to segmentation of RPC sequences. The method preferably combines information-theoretic and machine-learning approaches. The system preferably includes a learning engine and an operation engine. A learning engine may comprise a data preparation subsystem (feature extraction) and a Bayes Net learning subsystem (model construction). The operation engine may comprise transaction segmentation and transaction classification subsystems.

31 Claims, 11 Drawing Sheets

METHOD AND SYSTEM FOR RECOGNIZING END-USER TRANSACTIONS

FIELD OF THE INVENTION

The present invention relates generally to management of distributed systems and, more particularly, to recognizing end-user transactions comprising sequences of remote procedure calls (RPCs) received at a server.

BACKGROUND OF THE INVENTION

Providing good quality of service (e.g., low response times) to end-users of distributed information systems is essential for e-commerce, among other applications. An important step in performance management of such systems is modeling the end-user behavior. A realistic end-user model allows to: (a) better quantify end-user perception of performance; (b) create representative workloads; (c) provide better resource management; and (d) improve the system's security by recognizing potentially dangerous end-user behavior patterns.

A first step in building an end-user model is to characterize end-user transactions (EUTs). EUTs comprise a sequence of commands that end-users issue to their workstation such as, for example, opening a database, opening a view, reading several records and closing the database. In distributed systems, these commands typically cause remote procedure calls (RPCs) to be sent from the user's workstation to one or more tiers of servers that process the RPCs. To illustrate the foregoing, we use the Lotus Notes e-mail system. Common RPCs include OPEN_DB, READ_ENTRIES, and FIND_BY_KEY. Given a time ordered sequence of such RPCs from the same end-user, we want to identify the beginning and end of EUTs and label each type. Examples of the EUTs in Lotus Notes include: replication, search for a note, update notes, and resort view.

Because end-user workstations are so numerous and since they are often not the responsibility of the administrative staff, there is often little opportunity to collect information about EUTs from the workstation itself. Rather, it is at the servers where EUT information is obtained in the form of RPC sequences. Unfortunately, little information about end-user transactions is present at the server. In principle, client-server protocols could be instrumented to mark the beginning and end of user interactions. However, this is not sufficient to identify EUTs since users often view a sequence of application interactions as a single unit of work. In existing practice, this quandary is addressed either by using surrogates for EUTs (e.g., synthetic transaction generated by probing stations) or labeling EUTs manually for post-processing. The former often leads to incorrect assessments of service quality. The latter is extremely time consuming.

Therefore, it is highly desirable to have an automated system for recognizing EUT using the RPC sequences recorded on servers.

SUMMARY OF THE INVENTION

The present invention provides methods and systems for recognizing end-user transactions comprising sequences of remote procedure calls (RPCs) received at a server. Such methodologies are important for providing good quality of service (e.g., low response times) to end-users of information systems since, among other benefits, it allows to: (a) better quantify end-user perception of performance; (b) create representative workloads; (c) provide better resource management; and (d) improve the system's security by recognizing potentially dangerous user's behavior patterns.

The present invention proposes the use of machine-learning techniques to recognize EUTs, adapting several known methods to specific structural properties of our domain. Briefly, the EUT recognition problem has two parts. The first is segmenting the stream of RPCs (from each user) into transaction instances (segmentation problem). The second is labeling the segments with the correct transaction type (classification problem). The segmentation approach of the present invention uses a dynamic-programming technique, which allows an efficient reuse of previous computations. For classification, the present invention uses the Bayes Net framework, see, e.g., Pearl, Judea, "Probabilistic Reasoning in Intelligent Systems," Morgan Kaufmann, San Mateo, Calif., 1988, the disclosure of which is incorporated by reference herein. A Bayes Net is a graphical framework for reasoning under uncertainty, which encodes probabilistic dependencies among entities of interest (represented by random variables) and allows making predictions about unobserved entities given the data. In the present invention, we want to predict the EUT type given an RPC sequence encoded by a set of features. A Bayes Net is a directed acyclic graph (a graph with directed edges having no directed cycles) where random variables correspond to nodes and probabilistic dependencies are represented by edges. Each node has an allowed set of values called the domain of the variable. Bayes Nets are also called causal networks since directed arcs can be often interpreted as causal dependencies between the variables. The use of Bayes Net for classification is appealing because of several reasons. First, Bayes Nets are based on solid probabilistic ground which allows a better interpretation of the results (to compare, for example, to some other models, such as neural networks, which have a less clear semantics). Second, Bayesian framework allows incorporating prior domain knowledge, which is often as important as the information obtained purely from the data. Third, Bayes Nets allow learning causal dependencies rather than simply correlations in data.

The problem of recognizing end-user transactions have not yet been addressed in the literature. However, the problem of recognizing EUTs is closely related to several well-studied machine-learning domains such as pattern recognition, document classification, and speech recognition. A general pattern recognition problem is to assign one of the given class labels to a given instance represented by its feature vector. For example, in document classification, the task is to decide which of the given topics (class labels) is most relevant to a given text document (instance). A text document is represented by a set of features such as word occurrences or word counts. A classification algorithm, trained on a set of text examples labeled with the correct topics (training data), assigns topics to previously unseen text instances (test data). Examples of document classification applications include classification of Web pages, sorting electronic mail or news articles, learning user reading interests, see, e.g., Mitchell, Tom M., "Machine Learning," New York: McGraw-Hill, 1997, the disclosure of which is incorporated by reference herein. Also, an important part of pattern recognition is the feature selection problem, which includes selecting a feature type (e.g., word occurrences or word counts in text classification) and then selecting a subset of most informative features of a given type, which is especially important when the number of features is large.

Despite similarities with text classification, the EUT recognition problem is inherently more complex because it first requires segmenting the RPC sequence into segments representing different EUTs, and then labeling (classification) of those segments with EUTs. Some work on segmentation problem has been done in speech recognition where a stream of sounds is segmented into words, see, e.g., Jelinek, F., "Statistical Methods for Speech Recognition," Cambridge: MIT Press, 1998, the disclosure of which is incorporated by reference herein; and in statistical natural language processing where a sequence of words must be segmented into phrases, see e.g., D. Beeferman, A. Berger, and J. Lafferty, "Statistical Models for Text Segmentation," Machine Learning, special issue on Natural Language Learning, C. Cardie and R. Mooney (eds.), 34(1–3), pp. 177–210, 1999, the disclosure of which is incorporated by reference herein. A standard approach in speech recognition is to use Hidden Markov Models (HMM) for modeling dependencies between consecutive sounds. However, the domain of the present invention requires more complex dependence models, leading to a more general framework of Dynamic Belief Nets. Also, our domain poses particular structural properties not necessarily present in other domain, which can significantly improve the efficiency of our system.

Accordingly, the present invention provides systems and methods for recognizing end-user transactions using RPC sequences recorded on servers. Our approach has several innovation aspects, for example:

(1) We address the problem of EUT recognition that was not previously solved in performance management of distributed systems.

(2) We propose a system and method for automatic EUT recognition based on adaptation of machine-learning techniques to this novel domain.

(3) We also propose a method for automated generation of training data for our learning system instead of manual labeling. The method comprises instrumenting both client and server with a transaction marking agent.

In one aspect of the invention, an architecture of the invention comprises an EUT model learner component and an EUT recognizer component, corresponding to the two phases of the EUT recognition process, the training phase and the operation phase. In the training phase, the EUT model learner constructs the EUT Bayes Net Model from a set of training data which comprises a sequence of RPC labeled by the corresponding EUTs. Training data is currently produced by a human expert. In the operation phase, the EUT recognizer uses the EUT model to produce an EUT labeling for an input unlabeled RPC sequences. A feature selection component of the system of the invention works as a filter which converts an input RPC sequence into a set of EUT features used for subsequent classification.

In another aspect of the invention, a method of the invention comprises a data structuring step, selecting EUT features, learning EUT model, and EUT recognition using this model.

A Bayes Net classifier used by the inventive system contains a root node corresponding to the EUT type, which points to a set of feature nodes representing the features, such as occurrences or counts for each RPC type. Given an RPC sequence corresponding to one EUT, a feature extraction mechanism assigns the values to the feature nodes, and the Bayes Net classifier finds a most likely class (EUT label) for that assignment.

The EUT recognizer segments the input RPC stream into sequences corresponding to different EUTs and labels those sequences with appropriate EUTs using the Bayes Net classifier. The quality of segmentation is controlled by some quality metric; the segmentation/labeling process cycles until a satisfactory value of the metric is achieved.

Finally, the invention provides a method for automated marking of the EUTs at the client and at the server sites, which allows generation of unlimited amounts of training data. This inventive process replaces the currently time-consuming process of generating training data by a human expert, or by software that, again, uses manually constructed heuristics. The inventive process also improves the quality of training data.

The present invention provides several benefits not present in the existing state-of-the-art performance management of distributed systems, some examples of which will now be given. First, automated EUT recognition provides a better way of quantifying the end-user perception of the system performance, which is essential for a better service. Second, the EUT recognition results in realistic end-user models that can be used to create representative workloads, necessary for testing system's behavior under various circumstances. Third, realistic end-user and system models are essential for a better resource management. Finally, such models can be used for providing a better security based on comparison of typical and non typical pattern in user's behavior.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of illustrative system architectures. However, it is to be understood that the present invention is not limited to any particular system architecture or to a particular type of end-user transaction (EUT). Rather, the invention is more generally applicable to any system architecture and type of EUT in which it is desirable to recognize EUTs using remote procedure call (RPC) sequences in order to provide for modeling of end-user behavior.

Figure 1:
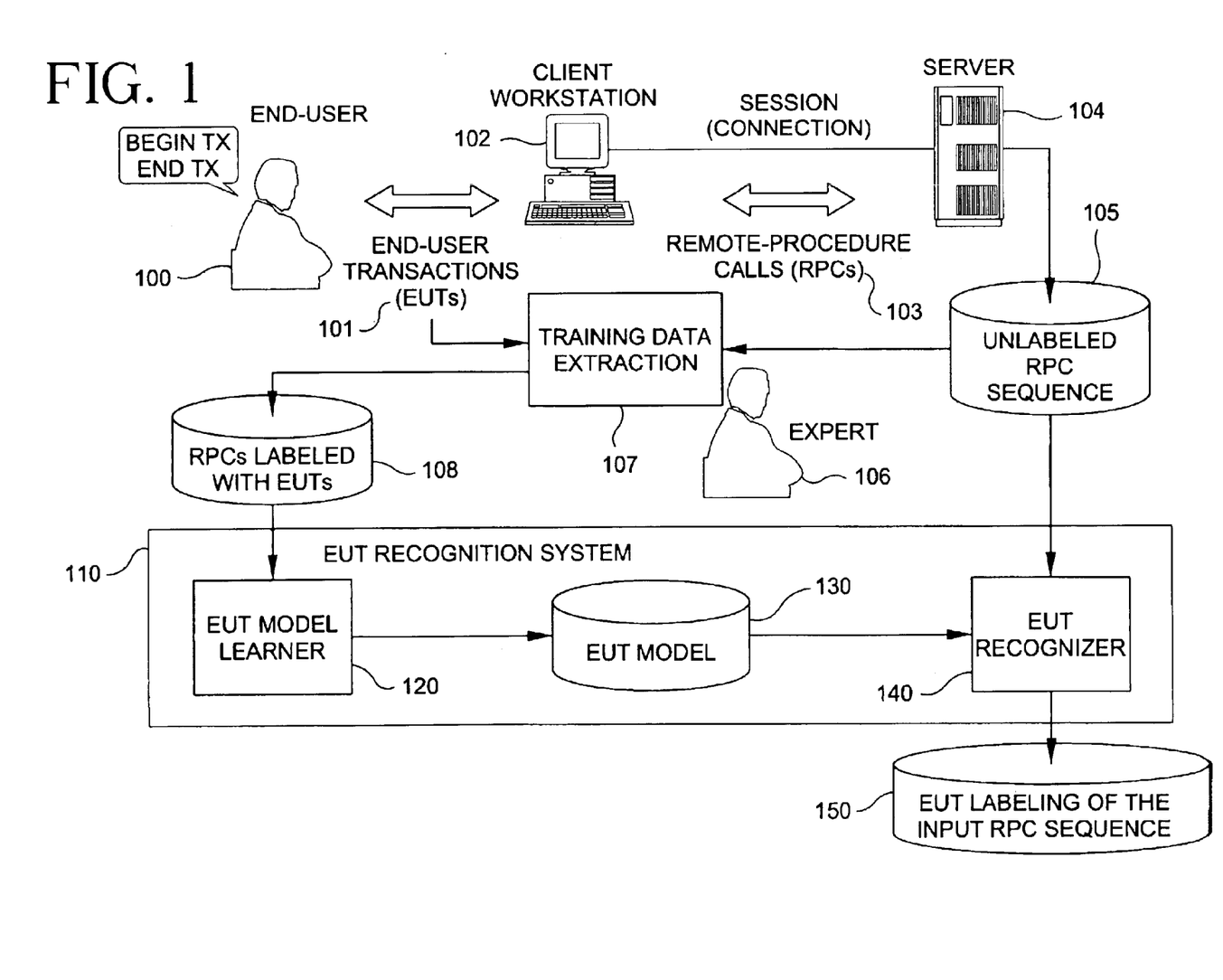
FIG. 1 is a block diagram illustrating an overall architecture of an end-user transaction recognition system according to one embodiment of the present invention in the context of a network with which the present invention may be employed.

Referring initially to FIG. 1, a block diagram illustrates an overall architecture of an end-user transaction recognition system according to one embodiment of the present invention in the context of a network with which the present invention may be employed. As shown, an end-user 100 issues a sequence of high-level commands, called end-user transactions or EUTs 101 such as, for example, opening a database or reading mail, to his/her workstation (client) 102. In distributed systems, as is known, each EUT causes a sequence of remote procedure calls or RPCs 103 to be sent from the user's workstation to one or more tiers of servers 104 that process the RPCs. It is to be understood that client workstation and the server may be computer systems coupled via a network. The network may be a public network (e.g., Internet), a private network and/or some other suitable network. In any case, the sequences of RPCs, together with other information such as, for example, session, time, etc., are stored in server log-files 105. However, no information about the EUTs is available on server.

Thus, as shown in FIG. 1 and in accordance with the present invention, an EUT recognition system 110 is provided which comprises the following components: an EUT model learner 120, an EUT model 130, and an EUT recognizer 140. In a training phase, the EUT model learner learns the EUT model which is later used by the EUT recognizer during the operation phase. The EUT model learner uses as an input training data which comprises an RPC sequence labeled with EUTs 108. In one embodiment, obtaining training data is accomplished by a human expert 106 who reconstructs an EUT sequence from RPC sequences stored on server at log-files 105. In accordance with another aspect of the present invention, as will be explained in the context of FIG. 10, the distributed system environment is configured so that a human expert can be replaced by an automated system for extracting training data 107. Thus, rather than requiring a human expert, RPCs labeled with EUTs in accordance with training data may be generated automatically by training data extraction system 107.

In any case, the EUT model 130 built by the EUT model learner 120 is used by the EUT recognizer 140, which takes as an input RPC sequences stored in server log-files 105 and outputs an EUT labeling of those sequences 150.

As will be explained further in the context of FIG. 11, it is to be appreciated that the EUT recognition system 110 and the training data extraction system 107 shown in FIG. 1 may be implemented on the server 104 or a separate computer system.

Figure 2:
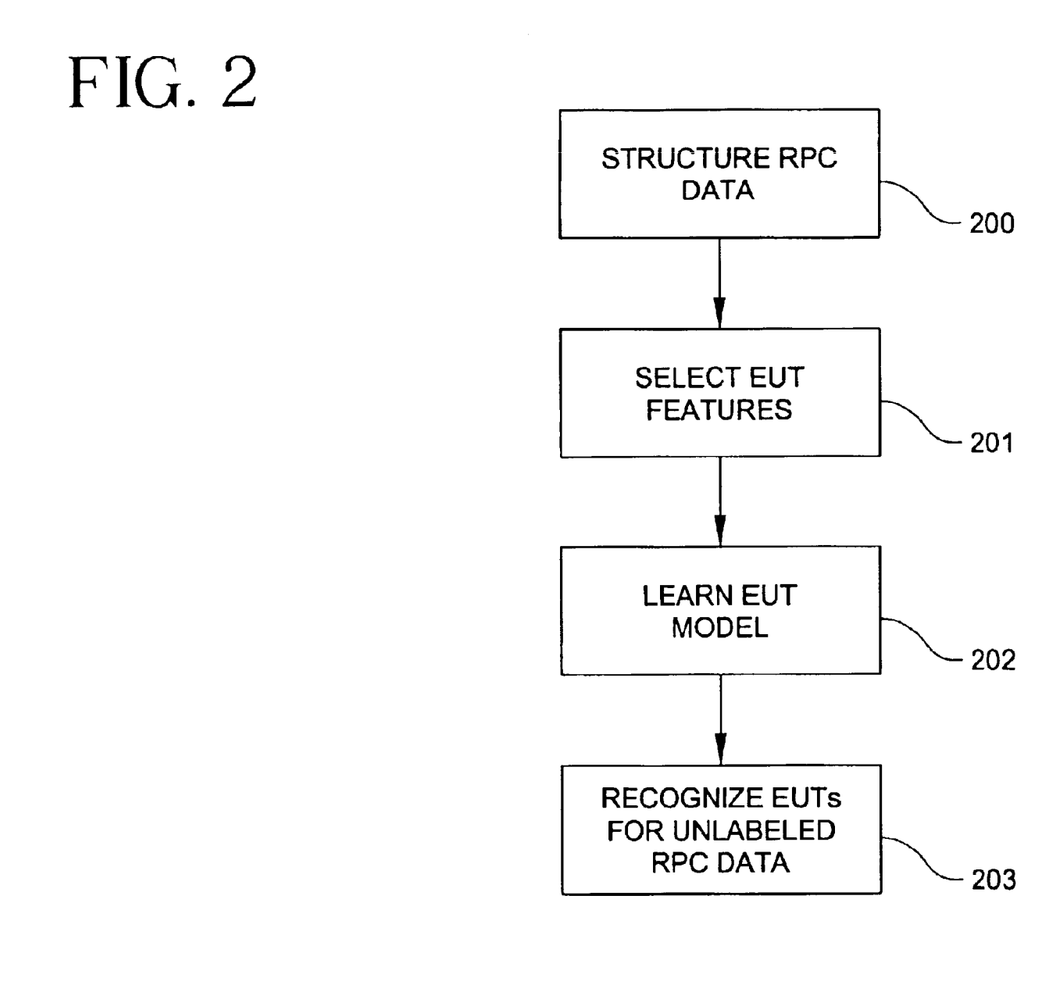
FIG. 2 is a flow diagram illustrating an end-user transaction recognition methodology according to one embodiment of the present invention.

Referring now to FIG. 2, a flow diagram illustrates an overall end-user transaction recognition methodology according to one embodiment of the present invention. It is to be appreciated that the first three steps comprise the training phase. In step 200, the input RPC data is structured into training data so that an RPC sequence from the server is labeled by the corresponding EUTs. As explained above, this mat be done by a human expert 106 (FIG. 1) or automatically by a training data extraction system 107 (FIG. 1). Next, in step 201, EUT features are selected. The features are used for constructing an EUT model in step 202. Finally, step 203 is the operation phase where the EUT model is used to recognize an EUT sequence corresponding to unlabeled RPC sequences.

Figure 3:
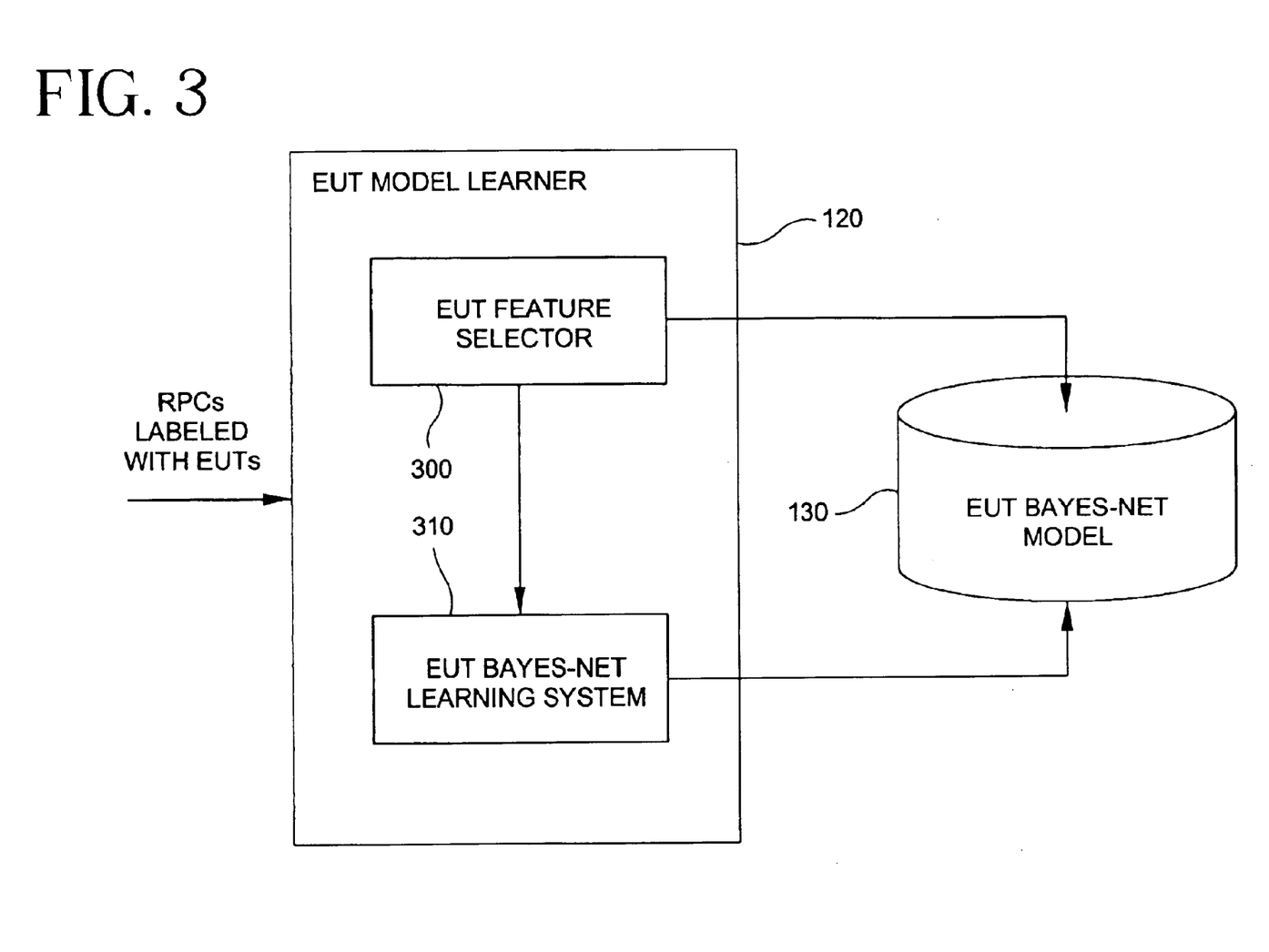
FIG. 3 is a block diagram illustrating components of an end-user transaction model learner according to one embodiment of the present invention.

Referring now to FIG. 3, a block diagram illustrates an end-user transaction model learner according to one embodiment of the present invention. Specifically, FIG. 3 depicts components of a EUT model learner module such as the EUT model learner 120 of FIG. 1. As shown, the model learner comprises an EUT feature selector 300 and an EUT Bayes Net learning system 310. The EUT feature selector is responsible for choosing particular characteristics of an RPC sequence such as, for example, occurrence of some RPC R within a transaction T. Those characteristics are key components of the EUT model and are used later by the EUT recognizer as distinguishing properties (features) of the corresponding EUTs. An RPC stream labeled with EUTs (training data), filtered through the EUT feature selector, comprises the input to the EUT Bayes Net learning system, which outputs the EUT Bayes Net model 130.

Figure 4:
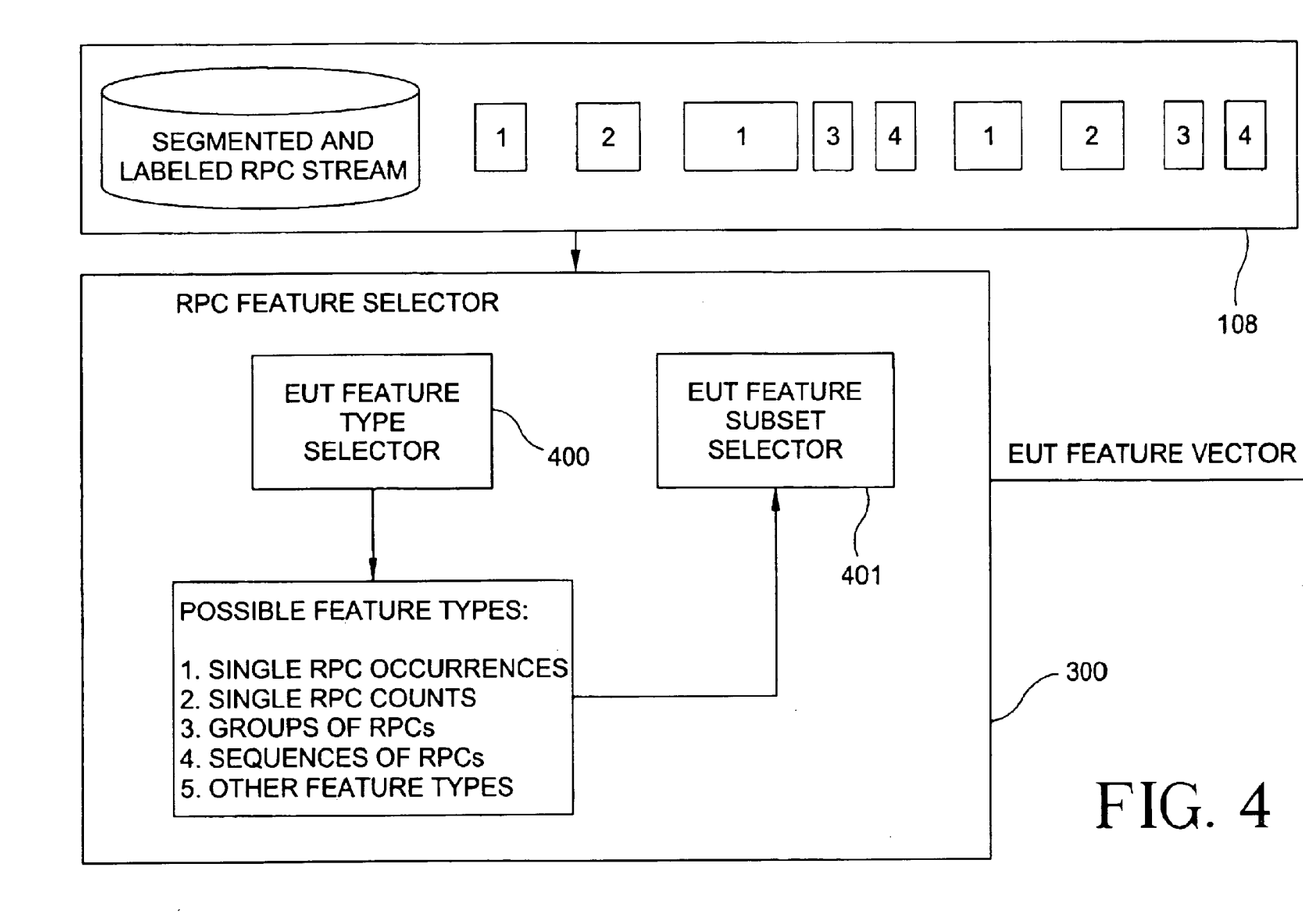
FIG. 4 is a block diagram illustrating components of an end-user transaction feature selector according to one embodiment of the present invention.

Referring now to FIG. 4, a block diagram illustrates an end-user transaction feature selector according to one embodiment of the present invention. Specifically, FIG. 4 describes an EUT feature selector such as the EUT feature selector 300 of FIG. 3. As shown, the EUT feature selector comprises an EUT feature type selector 400 and an EUT feature subset selector 401. First, the EUT feature type selector 400, in response to the segmented and labeled RPC stream 108, decides on the type of features (RPC stream properties) to be considered in the model. Possible feature types, for example, may include: binary features such as occurrence of a single RPC, or an occurrence of an RPC group (a pair, a triplet, etc.) in the EUT, and integer features such as counts of the corresponding occurrences. Once the feature type is selected, the EUT feature subset selector 410 computes the corresponding features for the given input (training data) and selects only a subset of features which have highest value according to some evaluation metric (e.g., most informative features with respect to the mutual information between a feature and the EUT label). Thus, the EUT feature selector works as a filter transforming each RPC subsequence labeled with an EUT into the corresponding collection of features (feature vector) with the same EUT label.

Figure 5:
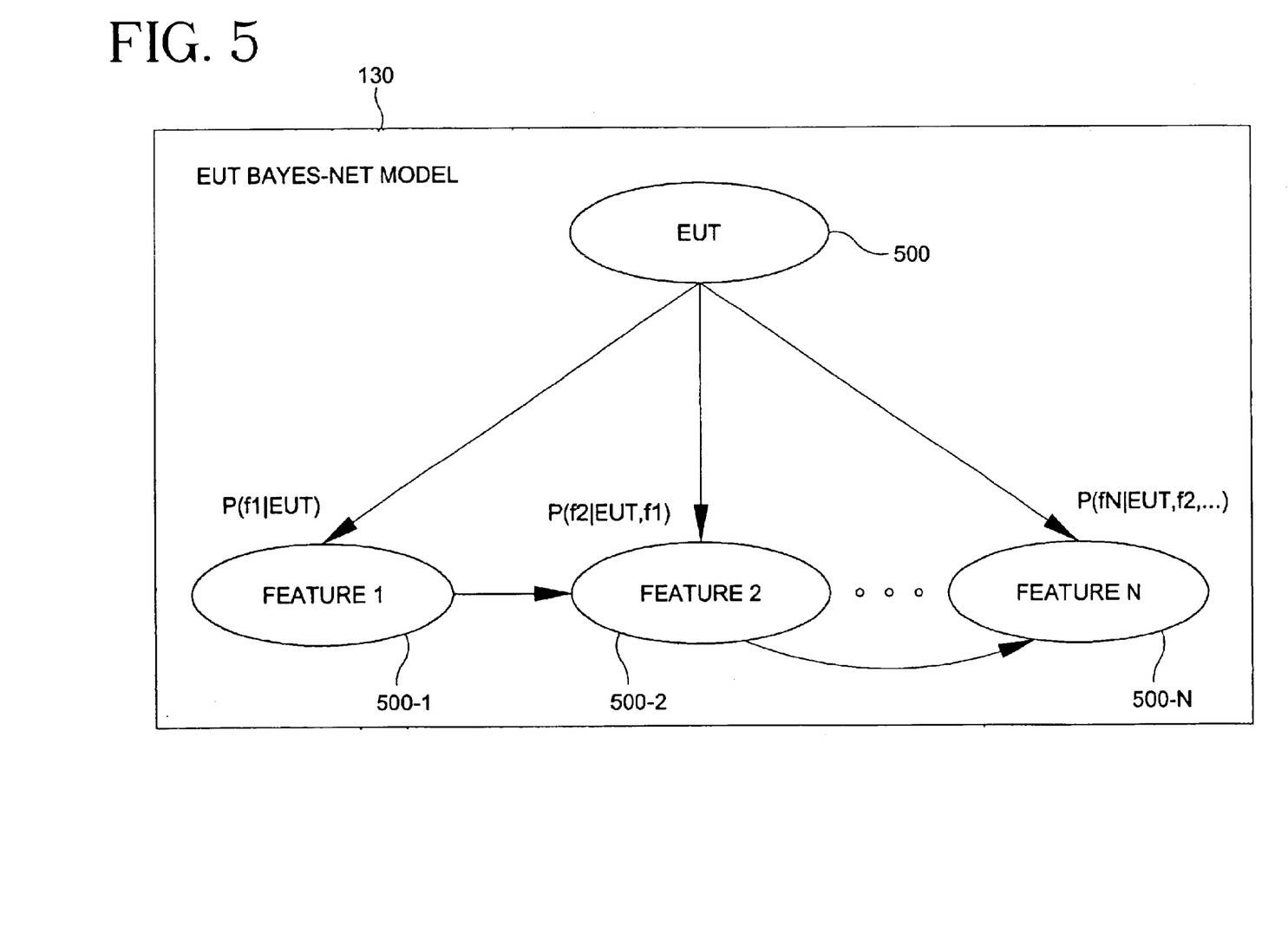
FIG. 5 is a diagram illustrating an end-user transaction Bayes Net model for use according to one embodiment of the present invention.

Referring now to FIG. 5, a diagram illustrates an end-user transaction Bayes Net model for use according to one embodiment of the present invention. Specifically, FIG. 5 illustrates an EUT Bayes Net model such as the EUT Bayes Net model 130 of FIG. 1. As shown, the root node 500 represents the EUT type, while the child nodes 500-1 through 500-N represent the EUT features. The root node is associated with the prior probability distribution of the transaction types, while each feature node "fN" is associated with a conditional probability distribution of this feature given the BUT type and the values of the other features that "fN" depends upon. For example, the conditional probability distribution associated with feature 2 is represented as $P(f2|EUT, f1)$.

Figure 6:
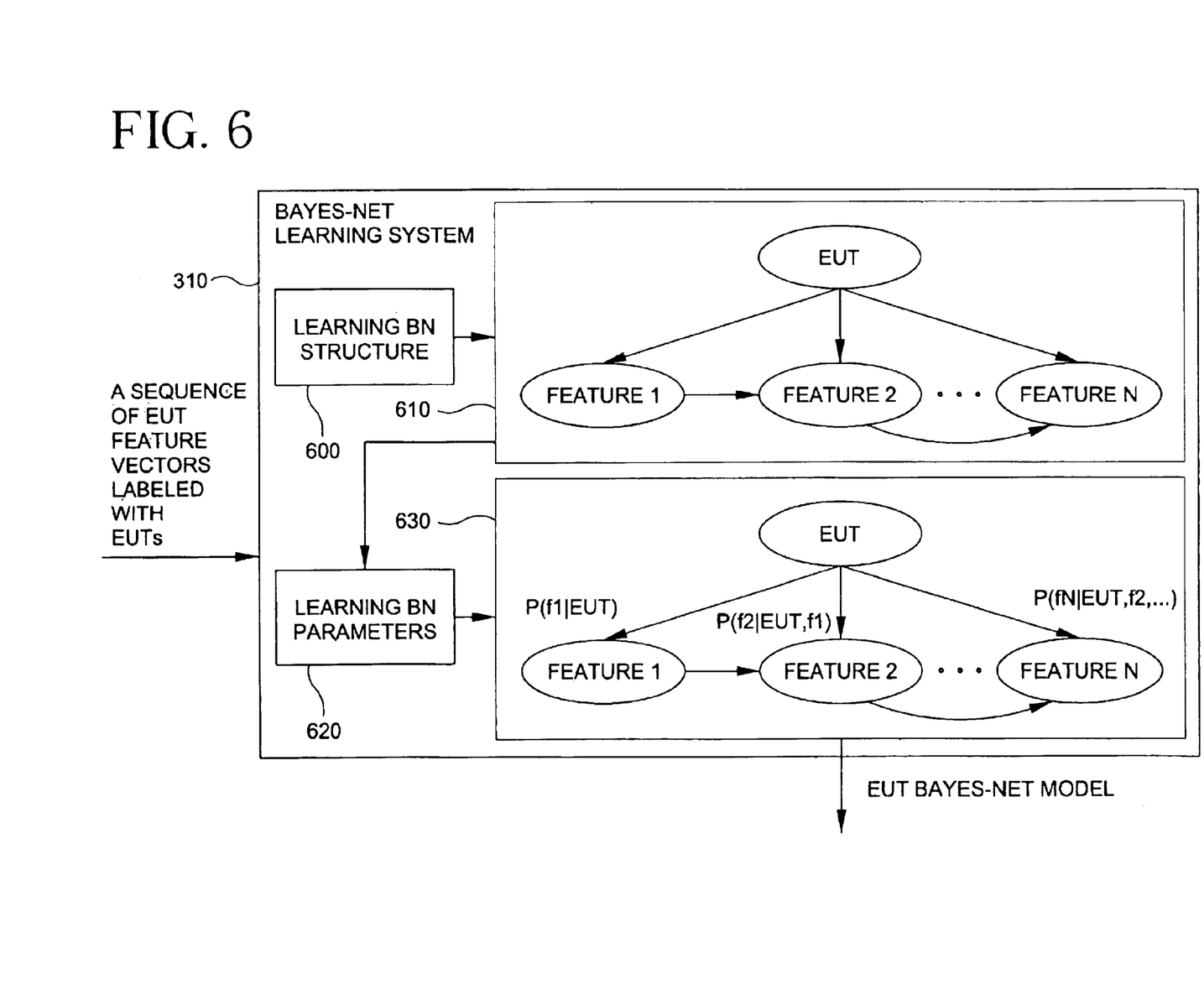
FIG. 6 is a block diagram illustrating an end-user transaction Bayes Net learning system according to one embodiment of the present invention.

Referring now to FIG. 6, a block diagram illustrates an end-user transaction Bayes Net learning system according to one embodiment of the present invention. Specifically, FIG. 6 illustrates an EUT Bayes Net (BN) learning system such as the EUT BN learning system 310 of FIG. 3. As shown, the learning system comprises a Bayes Net structure learning module 600 and a Bayes Net parameters learning module 620. The BN structure learning module 600 learns the graph structure of the EUT Bayes Net. Given the input sequence of EUT feature vectors labeled with EUTs, module 600 learns the dependencies between the features and produces a Bayes Net graph. An illustrative Bayes Net graph structure is shown in block 610. The second component of the learning system, the BN parameters learning module 620, learns the parameters of the Bayes Net, given the structure, and produces a EUT Bayes Net model which specifies both the dependencies between the feature nodes and the probability distributions corresponding for each node. An illustrative Bayes Net model is shown in block 630.

Figure 7:
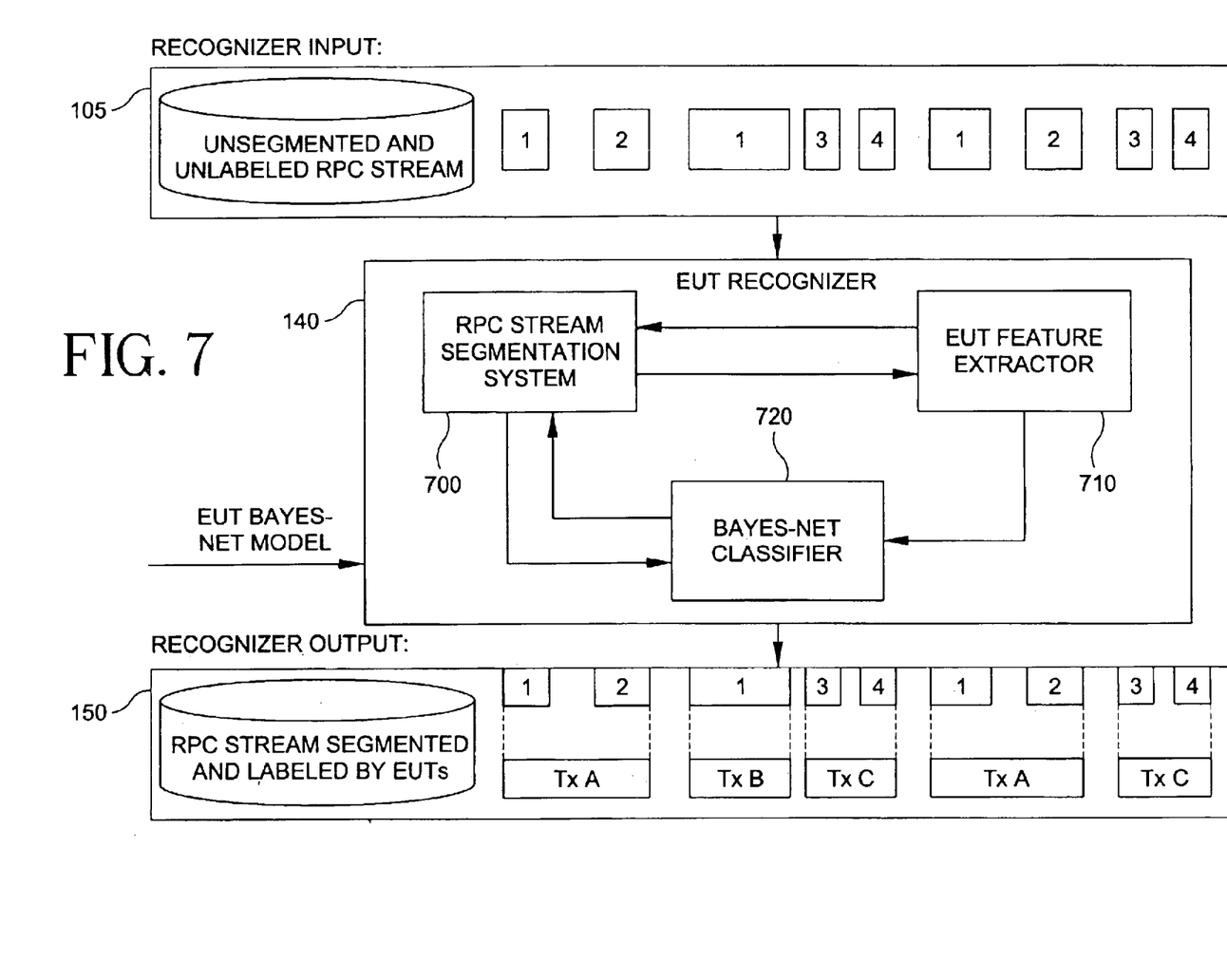
FIG. 7 is a block diagram illustrating an end-user transaction recognizer according to one embodiment of the present invention.

Referring now to FIG. 7, a block diagram illustrates an end-user transaction recognizer according to one embodiment of the present invention. Specifically, FIG. 7 illustrates an EUT recognizer such as the EUT recognizer 140 of FIG. 1. The EUT recognizer comprises an RPC stream segmentation system 700, and EUT feature extractor 710 and a Bayes Net classifier 720. After the training phase is finished, as explained in detail above, the resulting EUT Bayes Net model is available to the EUT recognizer. In general, the recognizer takes as an input an RPC sequence from the server log-files 105, separates the sequence into segments corresponding to the EUTs, labels the segments with the corresponding EUTs, and outputs the resulting segmented and labeled RPC sequence 150. Specifically, the RPC stream segmentation system 700 calls the other two parts, feature extractor 710 and classifier 720, during the segmentation process. The EUT feature extractor gets the information about the features to use from the EUT Bayes Net model (those features were selected during the training phase by the EUT feature selector 300), and extracts those features from the input data. The Bayes Net classifier outputs a most likely EUT label ('class label') given an RPC segment selected by the RPC stream segmentation system. Thus, the output (block 150) of the EUT recognizer 140 is the RPC sequence (depicted as blocks with numbers, e.g., 1, 2, 3, 4) segmented and labeled by EUTs (dotted lines relate the RPC segments and transaction labels, e.g., TxA, TxB, TxC).

Figure 8:
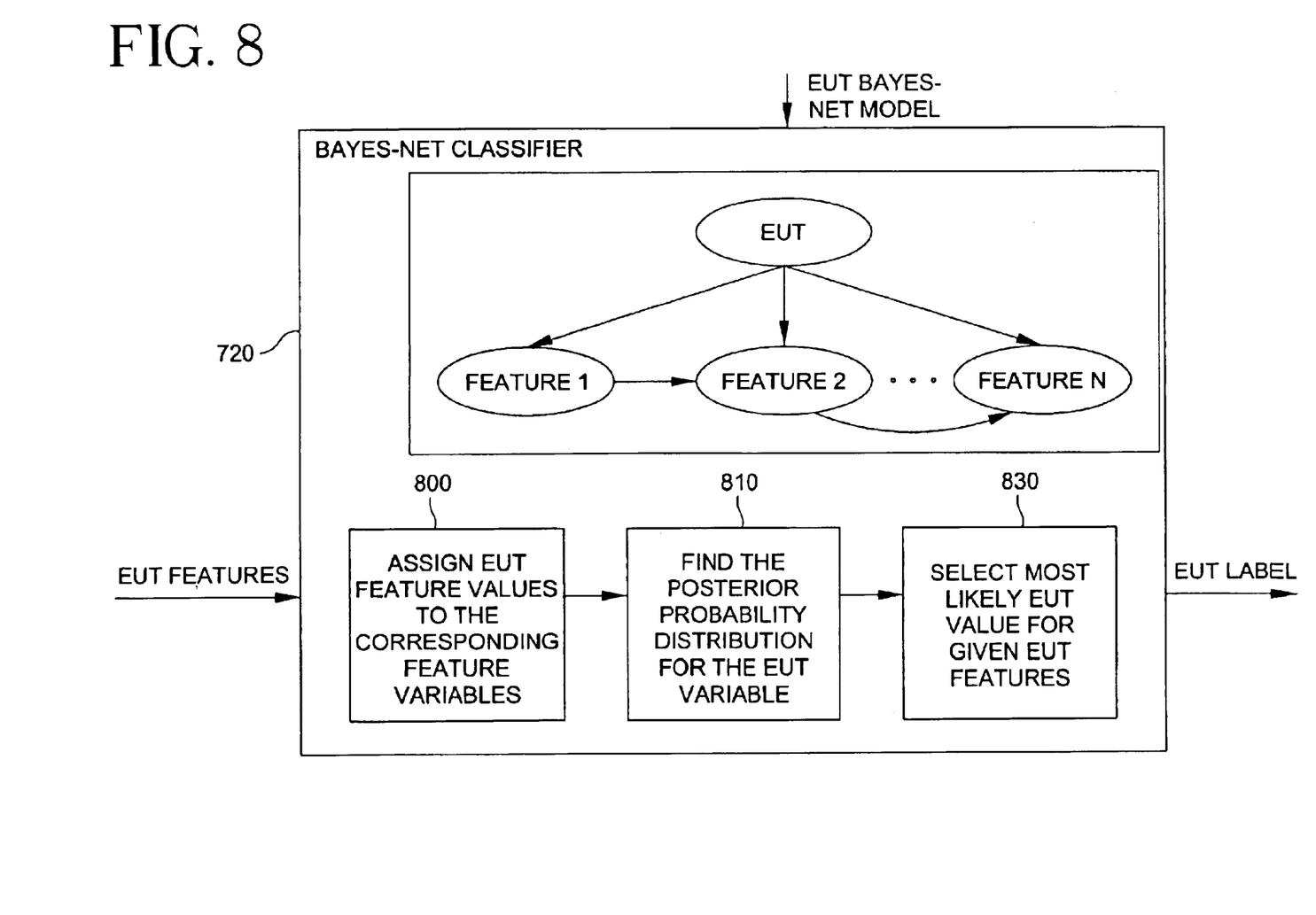
FIG. 8 is a block diagram illustrating a Bayes Net classifier and operations associated therewith according to one embodiment of the present invention.

Referring now to FIG. 8, a block diagram illustrates a Bayes Net classifier according to one embodiment of the present invention. Specifically, FIG. 8 illustrates a Bayes Net classifier such as the Bayes Net classifier 720 of FIG. 7. Given the EUT Bayes Net model, and the values of EUT features provided by the feature extractor 710, the classifier performs the following operations. First, in step 800, the classifier assigns EUT feature values to the corresponding feature variables. In step 810, the classifier finds the posterior probability distribution for the EUT variable. Then, in step 820, the classifier selects a most likely EUT value for given EUT features based on the posterior probability distribution for the EUT variable. The Bayes Net classifier then outputs this most likely EUT value as a class label for the given EUT feature vector.

Figure 9:
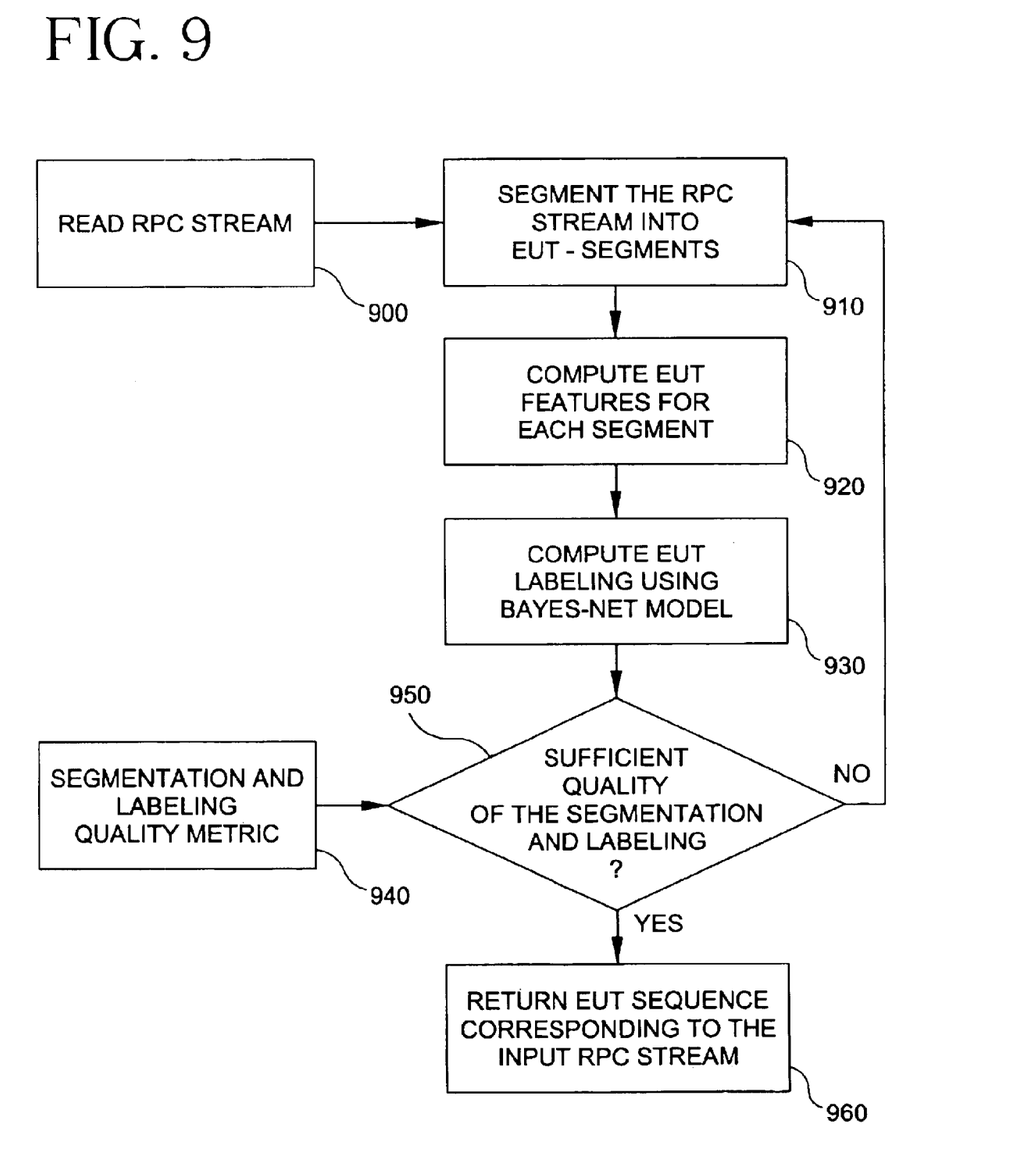
FIG. 9 is a flow diagram illustrating a methodology for use by an end-user transaction recognizer according to one embodiment of the present invention.

Referring now to FIG. 9, a flow diagram illustrates an overall methodology for use by an end-user transaction recognizer during an operational mode (as compared to a training mode) according to one embodiment of the present invention. In step 900, the recognizer reads the RPC stream from the server log-file 105. The RPC stream is then segmented into EUT-segments in step 910 (RPC stream segmentation system 700). In step 920, EUT feature vectors are computed for each segment (EUT feature extractor 710). Based on those feature vectors, the Bayes Net classifier 720 computes an EUT labeling of the segments, in step 930. The quality of the segmentation and labeling is evaluated in step 950 using a given quality metric from block 940. If the quality is sufficient, the recognizer outputs the resulting EUT labeling of the segmented RPC stream in step 960, otherwise, the process returns to step 910 and repeats.

Figure 10:
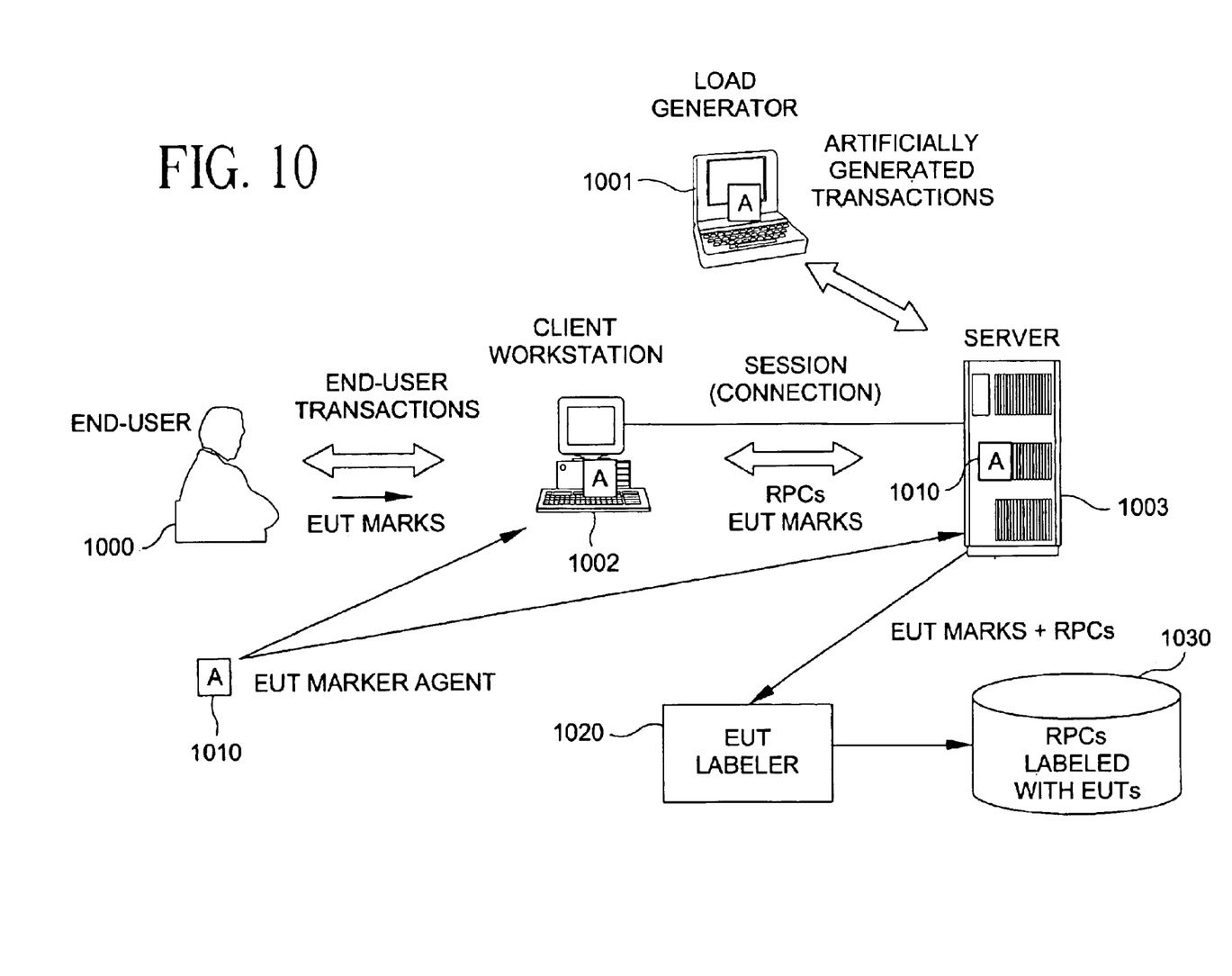
FIG. 10 is a block diagram illustrating a system for automated labeling of remote procedure calls with end-user transactions according to one embodiment of the present invention.

Referring now to FIG. 10, a block diagram illustrates a system for automated labeling of remote procedure calls with end-user transactions according to one embodiment of the present invention. Recall, as explained above in the context of FIG. 1, an EUT recognition system of the present invention may operate with a human expert 106 labeling RPCs with EUTs or with an automated system 107, such as is provided in accordance with the present invention and illustrated in the context of FIG. 10. As shown, an end-user 1000 sends the transactions to his/her workstation 1002, where the beginning and the end of each transaction is marked by an EUT marker agent 1010 residing on the client workstation. It is to be appreciated that this agent may be downloaded to the client's computer during the current or a previous session with the server 1003. An alternative approach is to use an artificial workload generator 1001 which generates a transaction sequence. Further, the EUTs cause a sequence of RPCs 1003 which are captured by another EUT marker agent 1010 residing on the server 1003. The RPC sequences together with the EUT marks are send to an EUT labeler 1020. The EUT labeler outputs the sequence of RPCs labeled with EUTs 1030 which are used as an input (training data) for EUT learner module 120 (FIG. 1).

Figure 11:
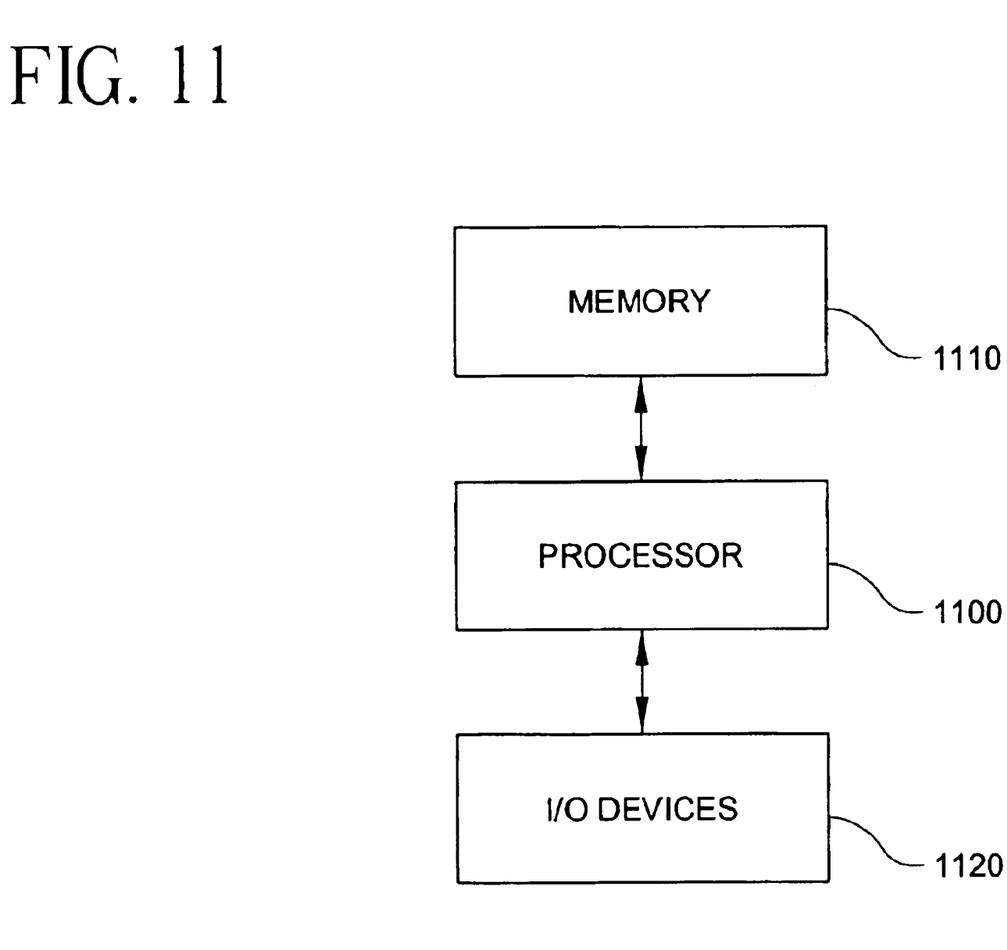
FIG. 11 is a block diagram illustrating a generalized hardware architecture of a computer system suitable for implementing an end-user transaction recognition system and/or a system for automated labeling of remote procedure calls with end-user transactions according to the present invention.

Referring now to FIG. 11, a block diagram is shown illustrating a generalized hardware architecture of a computer system suitable for implementing the various functional components/modules of an EUT recognition system (FIG. 1) and a system for automated labeling of RPCs with EUTs (FIG. 10) as depicted in the figures and explained in detail herein. It is to be understood that the individual components of the EUT recognition system and the automated labeling system may be implemented on one such computer system, or on more than one separate such computer system. Also, individual components of the subsystems and storage repositories may be implemented on separate such computer systems. It is to be appreciated that the components illustrated in FIG. 11 may be a part of the server computer system with which the end-user's client workstation is transacting or part of one or more separate computer systems.

As shown, the computer system may be implemented in accordance with a processor 1100, a memory 1110 and I/O devices 1120. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Accordingly, as has been explained herein, methods and systems are described for end-user transaction recognition based on server data such as sequences of remote procedure calls (RPCs). The method may comprise machine-learning techniques for pattern recognition such as Bayesian classification, feature extraction mechanisms, and a dynamic-programming approach to segmentation of RPC sequences. The method preferably combines information-theoretic and machine-learning approaches. The system preferably includes a learning engine and an operation engine. A learning engine may comprise a data preparation subsystem (feature extraction) and a Bayes Net learning subsystem (model construction). The operation engine may comprise transaction segmentation and transaction classification subsystems.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. Apparatus for recognizing one or more end-user transactions originating at a client workstation from one or more remote procedure calls, corresponding to the one or more end-user transactions, received at a server in communication with the client workstation, the apparatus comprising:
   at least one processor operative to: (i) obtain the one or more remote procedure calls; and (ii) recognize one or more end-user transactions from the one or more remote procedure calls based on training data associated with one or more of the remote procedure calls; and
   a memory, coupled to the at least one processor, for storing at least a portion of results associated with the end-user transaction recognition operation.

2. The apparatus of claim 1, wherein the at least one processor is further operative to perform the end-user transaction recognition operation by: (i) segmenting the one or more remote procedure calls into end-user transaction segments; (ii) extracting end-user transaction features for each segment; and (iii) computing the one or more end-user transactions from the extracted end-user transaction features for each segment using a model generated from the training data.

3. The apparatus of claim 2, wherein the model is a Bayes Net model.

4. The apparatus of claim 3, wherein the at least one processor is further operative to perform the end-user transaction computing operation by: (i) assigning a feature value to the corresponding extracted features, the feature value being associated with the Bayes Net model; (ii) finding a posterior probability distribution for each feature value; and (iii) selecting a feature value to represent one or more end-user transactions based on the posterior probability distribution.

5. The apparatus of claim 4, wherein the feature value selection operation comprises selecting the most likely feature value for a given extracted feature to represent one or more end-user transactions.

6. The apparatus of claim 4, wherein the selected feature values form a class label representative of one or more end-user transactions.

7. The apparatus of claim 1, wherein at least a portion of the results are compared to a quality metric to determine whether the results are of a sufficient quality.

8. Apparatus for generating a model for use in recognizing one or more end-user transactions originating at a client workstation from one or more remote procedure calls, corresponding to the one or more end-user transactions, received at a server in communication with the client workstation, the apparatus comprising:
   at least one processor operative to: (i) obtain one or more remote procedure calls labeled with one or more end-user transactions; (ii) compute one or more selected features on which the model is to be trained from the labeled remote procedure calls, the one or more selected features being labeled with the one or more end-user transactions; and (iii) construct the model from the selected features; and
   a memory, coupled to the at least one processor, for storing at least a portion of results associated with one or more of the model generating operations.

9. The apparatus of claim 8, wherein the one or more labeled remote procedure calls are manually generated.

10. The apparatus of claim 8, wherein the one or more labeled remote procedure calls are automatically generated.

11. The apparatus of claim 8, wherein the at least one processor is further operative to construct the model by: (i) learning dependencies between the computed features to form a model structure; and (ii) learning one or more model parameters given the structure to form the model.

12. The apparatus of claim 8, wherein the model is a Bayes Net model.

13. Apparatus for automatically generating training data used to construct a model for use in recognizing one or more end-user transactions originating at a client workstation from one or more remote procedure calls, corresponding to the one or more end-user transactions, received at a server in communication with the client workstation, the apparatus comprising:
   at least one processor operative to: (i) cause the client workstation to mark the beginning and end of one or more end-user transactions originating at the client workstation; and (ii) correlating the end-user transaction marks with the one or more remote procedure calls received at the server to generate remote procedure calls labeled with end-user transactions, the labeled remote procedure calls serving as the training data; and
   a memory, coupled to the at least one processor, for storing at least a portion of results associated with one or more of the training data generating operations.

14. The apparatus of claim 13, wherein the at least one processor is further operative to download a marking agent to the client workstation for use in marking the end-user transactions.

15. A method of recognizing one or more end-user transactions originating at a client workstation from one or more remote procedure calls, corresponding to the one or more end-user transactions, received at a server in communication with the client workstation, the method comprising the steps of:
   obtaining the one or more remote procedure calls; and
   recognizing one or more end-user transactions from the one or more remote procedure calls based on training data associated with one or more of the remote procedure calls.

16. The method of claim 15, wherein the end-user transaction recognition step comprises: (i) segmenting the one or more remote procedure calls into end-user transaction segments; (ii) extracting end-user transaction features for each segment; and (iii) computing the one or more end-user transactions from the extracted end-user transaction features for each segment using a model generated from the training data.

17. The method of claim 16, wherein the model is a Bayes Net model.

18. The method of claim 17, wherein the end-user transaction computing step comprises: (i) assigning a feature value to the corresponding extracted features, the feature value being associated with the Bayes Net model; (ii) finding a posterior probability distribution for each feature value; and (iii) selecting a feature value to represent one or more end-user transactions based on the posterior probability distribution.

19. The method of claim 18, wherein the feature value selection step comprises selecting the most likely feature value for a given extracted feature to represent one or more end-user transactions.

20. The method of claim 18, wherein the selected feature values form a class label representative of one or more end-user transactions.

21. The method of claim 15, wherein at least a portion of the results are compared to a quality metric to determine whether the results are of a sufficient quality.

22. A method of generating a model for use in recognizing one or more end-user transactions originating at a client workstation from one or more remote procedure calls, corresponding to the one or more end-user transactions, received at a server in communication with the client workstation, the method comprising the steps of:

obtaining one or more remote procedure calls labeled with one or more end-user transactions;

computing one or more selected features on which the model is to be trained from the labeled remote procedure calls, the one or more selected features being labeled with the one or more end-user transactions; and constructing the model from the selected features.

23. The method of claim 22, wherein the one or more labeled remote procedure calls are manually generated.

24. The method of claim 22, wherein the one or more labeled remote procedure calls are automatically generated.

25. The method of claim 22, wherein the model constructing step comprises: (i) learning dependencies between the computed features to form a model structure; and (ii) learning one or more model parameters given the structure to form the model.

26. The method of claim 22, wherein the model is a Bayes Net model.

27. A method of automatically generating training data used to construct a model for use in recognizing one or more end-user transactions originating at a client workstation from one or more remote procedure calls, corresponding to the one or more end-user transactions, received at a server in communication with the client workstation, the method comprising the steps of:

causing the client workstation to mark the beginning and end of one or more end-user transactions originating at the client workstation; and correlating the end-user transaction marks with the one or more remote procedure calls received at the server to generate remote procedure calls labeled with end-user transactions, the labeled remote procedure calls serving as the training data.

28. The method of claim 27, wherein the causing step comprises downloading a marking agent to the client workstation for use in marking the end-user transactions.

29. An article of manufacture for recognizing one or more end-user transactions originating at a client workstation from one or more remote procedure calls, corresponding to the one or more end-user transactions, received at a server in communication with the client workstation, comprising a machine readable medium containing one or more programs which when executed implement the steps of:

obtaining the one or more remote procedure calls; and recognizing one or more end-user transactions from the one or more remote procedure calls based on training data associated with one or more of the remote procedure calls.

30. An article of manufacture for generating a model for use in recognizing one or more end-user transactions originating at a client workstation from one or more remote procedure calls, corresponding to the one or more end-user transactions, received at a server in communication with the client workstation, comprising a machine readable medium containing one or more programs which when executed implement the steps of:

obtaining one or more remote procedure calls labeled with one or more end-user transactions;

computing one or more selected features on which the model is to be trained from the labeled remote procedure calls, the one or more selected features being labeled with the one or more end-user transactions; and constructing the model from the selected features.

31. An article of manufacture for automatically generating training data used to construct a model for use in recognizing one or more end-user transactions originating at a client workstation from one or more remote procedure calls, corresponding to the one or more end-user transactions, received at a server in communication with the client workstation, comprising a machine readable medium containing one or more programs which when executed implement the steps of:

causing the client workstation to mark the beginning and end of one or more end-user transactions originating at the client workstation; and correlating the end-user transaction marks with the one or more remote procedure calls received at the server to generate remote procedure calls labeled with end-user transactions, the labeled remote procedure calls serving as the training data.

* * * * *